(12) United States Patent
Seo et al.

(10) Patent No.: US 8,328,678 B2
(45) Date of Patent: Dec. 11, 2012

(54) GEAR TRAIN OF AUTOMATIC TRANSMISSION FOR VEHICLES

(75) Inventors: Kangsoo Seo, Suwon-si (KR); Seong Wook Hwang, Gunpo-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 218 days.

(21) Appl. No.: 12/957,981

(22) Filed: Dec. 1, 2010

(65) Prior Publication Data

US 2011/0294617 A1    Dec. 1, 2011

(30) Foreign Application Priority Data

May 31, 2010    (KR) ................. 10-2010-0051452

(51) Int. Cl.
*F16H 3/62*    (2006.01)
(52) U.S. Cl. ...................................... 475/271; 475/275
(58) Field of Classification Search .............. 475/271, 475/275
See application file for complete search history.

(56) References Cited

U.S. PATENT DOCUMENTS

| | | | |
|---|---|---|---|
| 6,746,357 B1* | 6/2004 | Usoro et al. ............... | 475/275 |
| 6,752,736 B1* | 6/2004 | Lee et al. .................. | 475/275 |
| 6,758,784 B2* | 7/2004 | Lee et al. .................. | 475/275 |
| 8,043,189 B2* | 10/2011 | Phillips et al. ............ | 475/275 |
| 2004/0121876 A1* | 6/2004 | Usoro et al. ............... | 475/275 |
| 2006/0142112 A1* | 6/2006 | Kamada et al. ............ | 475/275 |
| 2008/0108473 A1* | 5/2008 | Shim ......................... | 475/276 |
| 2009/0036253 A1* | 2/2009 | Phillips et al. ............ | 475/275 |

* cited by examiner

*Primary Examiner* — Sherry Estremsky
(74) *Attorney, Agent, or Firm* — Morgan, Lewis & Bockius LLP (57) ABSTRACT

A gear train of an automatic transmission realizes at least ten forward speeds and one reverse speed by combining four simple planetary gear sets with four clutches and two brakes and three friction elements are operated at each shift-speed such that the gear train has advantages of simplifying structures of the automatic transmission and improving power delivery performance and fuel economy.

6 Claims, 13 Drawing Sheets

| | C1 | C2 | C3 | C4 | B1 | B2 | gear ratio |
|---|---|---|---|---|---|---|---|
| D1 | | | ● | | ● | ● | 4.700 |
| D2 | | ● | | | ● | ● | 3.133 |
| D3 | | ● | ● | | ● | | 1.340 |
| D4 | | ● | | ● | ● | | 1.159 |
| D5 | | | ● | ● | ● | | 1.072 |
| D6 | ● | | ● | | ● | | 1.059 |
| D7 | ● | ● | ● | | | | 1.000 |
| D8 | ● | | ● | | | ● | 0.869 |
| D9 | | | ● | ● | | ● | 0.839 |
| D10 | ● | | | ● | | ● | 0.667 |
| REV | ● | | | | ● | ● | -3.280 |

GEAR TRAIN OF AUTOMATIC TRANSMISSION FOR VEHICLES

CROSS-REFERENCE TO RELATED APPLICATION

The present application claims priority to Korean Patent Application No. 10-2010-0051452 filed in the Korean Intellectual Property Office on May 31, 2010, the entire contents of which is incorporated herein for all purposes by this reference.

BACKGROUND OF THE INVENTION

1. Field of the Invention

The present invention relates to a gear train of an automatic transmission for vehicles which realizes at least ten forward speeds and one reverse speed by combining four simple planetary gear sets with four clutches and two brakes.

2. Description of Related Art

A typical shift mechanism of an automatic transmission utilizes a combination of a plurality of planetary gear sets. A gear train of such an automatic transmission that includes the plurality of planetary gear sets changes rotational speed and torque received from a torque converter of the automatic transmission, and accordingly transmits the changed torque to an output shaft.

It is well known that when a transmission realizes a greater number of shift speeds, speed ratios of the transmission can be more optimally designed, and therefore a vehicle can have economical fuel mileage and better performance. For that reason, an automatic transmission that is able to realize more shift speeds is under continuous investigation.

In addition, with the same number of speeds, features of a gear train, such as durability, efficiency in power transmission, and size, substantially depend on the layout of the combined planetary gear sets. Therefore, designs for a combining structure of a gear train are also under continuous investigation.

A manual transmission that has too many speeds causes inconvenience to a driver. Therefore, the advantageous features of having more shift-speeds are more important in an automatic transmission because an automatic transmission automatically controls the shifting operations.

Currently, four-speed and five-speed automatic transmissions are most often found on the market. However, six-speed automatic transmissions have also been realized for enhancement of performance of power transmission and for enhanced fuel mileage of a vehicle. In addition, seven-speed automatic transmissions and eight-speed automatic transmissions have been developed at a good pace.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide a gear train of an automatic transmission for vehicles having advantages of simplifying structures of the automatic transmission and improving power delivery performance and fuel economy as a consequence of realizing at least ten forward speeds and one reverse speed by combining four simple planetary gear sets with four clutches and two brakes.

In an aspect of the present invention, the gear train of an automatic transmission for vehicles may include a first planetary gear set having a first sun gear, a first planet carrier, and a first ring gear as rotation elements thereof, a second planetary gear set having a second sun gear, a second planet carrier, and a second ring gear as rotation elements thereof, a third planetary gear set having a third sun gear, a third planet carrier, and a third ring gear as rotation elements thereof, a fourth planetary gear set having a fourth sun gear, a fourth planet carrier, and a fourth ring gear as rotation elements thereof, and a plurality of friction members, wherein a rotation element of the first planetary gear set is connected to a rotation element of the second planetary gear set through a first power transmitting member, another rotation element of the second planetary gear set is connected to a rotation element of the third planetary gear set through a second power transmitting member, another rotation element of the third planetary gear set is connected to a rotation element of the fourth planetary gear set through a third power transmitting member, and another rotation element of the fourth planetary gear set is connected to another rotation element of the first planetary gear set through a fourth power transmitting member such that eight rotation elements are formed, wherein the eight rotation elements comprises a first rotation element including an input shaft directly connected to the second ring gear, a second rotation element including an output shaft connected to the fourth planet carrier connected to the third ring gear through the third power transmitting member, a third rotation element including the first power transmitting member directly connecting the first and second sun gears, a fourth rotation element including the first ring gear, a fifth rotation element including the second power transmitting member directly connecting the second planet carrier with the third sun gear, a sixth rotation element including the fourth power transmitting member directly connecting the first planet carrier with the fourth ring gear, a seventh rotation element including the third planet carrier, and an eighth rotation element including the fourth sun gear, and wherein the plurality of friction members comprises first, second, third, and fourth clutches selectively connecting the rotation elements with other rotation elements and first and second brakes selectively connecting the rotation elements with a transmission housing.

The first, second, third, and fourth planetary gear sets may be disposed in a sequence of the first planetary gear set, the second planetary gear set, the third planetary gear set, and the fourth planetary gear set from an engine.

The first, third, and fourth planetary gear sets may be single pinion planetary gear sets and the second planetary gear set may be a double pinion planetary gear set.

The friction member may include: the first clutch selectively connecting the sixth rotation element with the seventh rotation element; the second clutch selectively connecting the fifth rotation element with the eighth rotation element; the third clutch selectively connecting the first rotation element with the eighth rotation element; the fourth clutch selectively connecting the fifth rotation element with the sixth rotation element; the first brake selectively connecting the fourth rotation element with the transmission case; and the second brake selectively connecting the third rotation element with the transmission case.

The first and second brakes may be disposed at an external circumferential portion of the first planetary gear set, and the first, second, third, and fourth clutches may be disposed between the second and third planetary gear sets.

The third clutch and the first and second brakes may be operated at a first forward speed, the second clutch and the first and second brakes may be operated at a second forward speed, the second and third clutches and the first brake may be operated at a third forward speed, the second and fourth clutches and the first brake may be operated at a fourth forward speed, the third and fourth clutches and the first brake may be operated at a fifth forward speed, the first and third clutches and the first brake may be operated at a sixth forward speed, the first, second, and third clutches may be operated at a seventh forward speed, the first and third clutches and the second brake may be operated at an eighth forward speed, the third and fourth clutches and the second brake may be operated at a ninth forward speed, the first and fourth clutches and the second brake may be operated at a tenth forward speed, and the first clutch and the first and second brakes may be operated at a reverse speed.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Description of components that are not necessary for explaining the present invention will be omitted, and the same constituent elements are denoted by the same reference numerals in this specification.

In the detailed description, ordinal numbers are used for distinguishing constituent elements having the same terms, and have no specific meanings.

Figure 1:
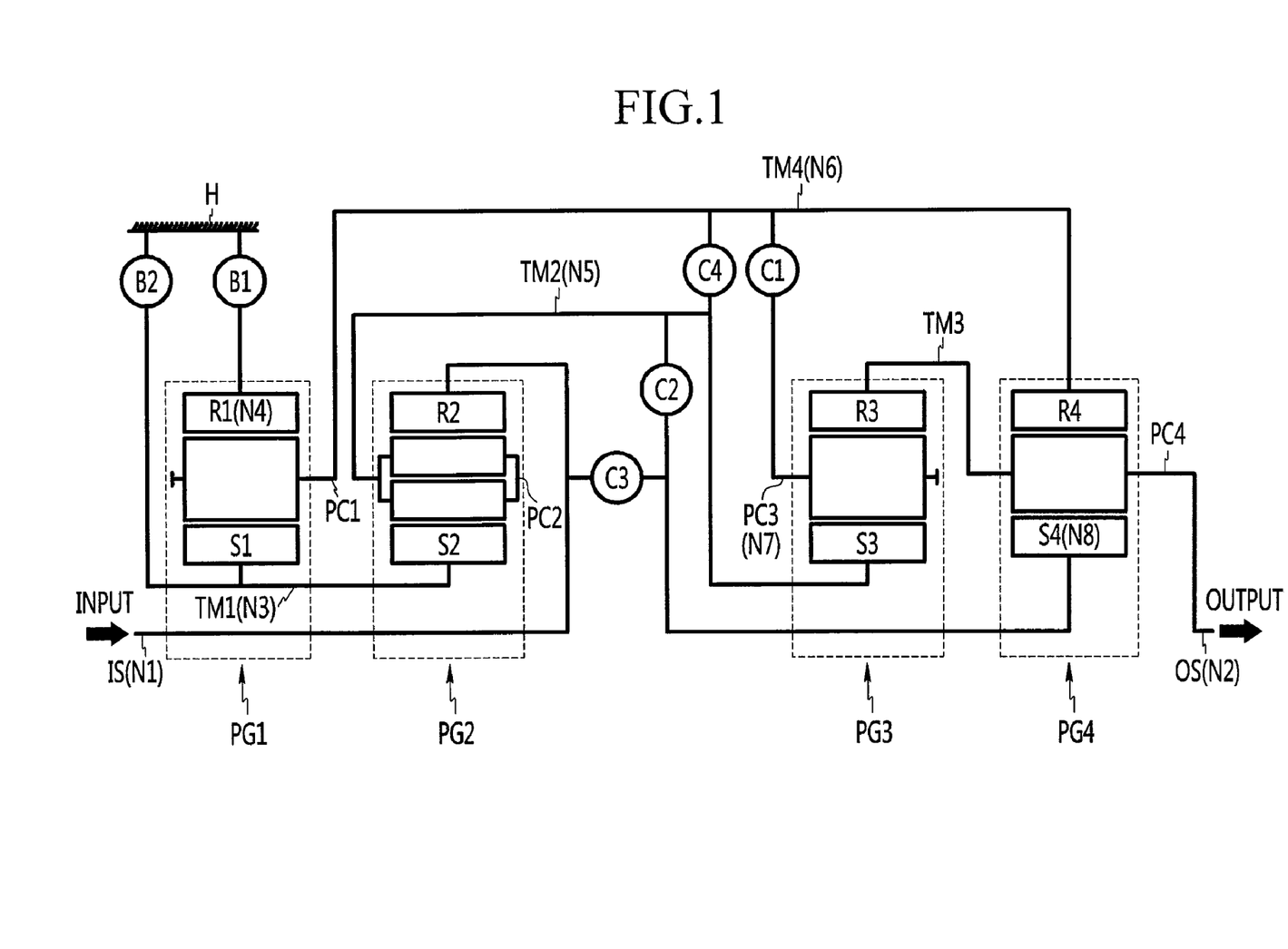
FIG. 1 is a schematic diagram of a gear train according to an exemplary embodiment of the present invention.

FIG. 1 is a schematic diagram of a gear train according to an exemplary embodiment of the present invention. A gear train according to an exemplary embodiment of the present invention includes first, second, third, and fourth planetary gear sets PG1, PG2, PG3, and PG4 disposed on the same axis, clutch means including four clutches C1, C2, C3, and C4, and brake means including two brakes B1 and B2.

Accordingly, a rotational speed input from an input shaft IS is changed by the first, second, third, and fourth planetary gear sets PG1, PG2, PG3, and PG4 and is output through an output shaft OS. The first planetary gear set PG1 is disposed close to an engine, and the second, third, and fourth planetary gear sets PG2, PG3, and PG4 are sequentially dispose at the back of the first planetary gear set PG1.

The input shaft IS is an input member and denotes a turbine shaft of a torque converter. Torque transmitted from a crankshaft of the engine is converted by the torque converter and is input to the gear train through the input shaft IS. The output shaft OS is an output member and is connected to a well-known differential apparatus so as to transmit an output of the gear train to driving wheels.

The first planetary gear set PG1 is a single pinion planetary gear set, and has three rotation elements including a sun gear, a planet carrier, and a ring gear. For better comprehension and ease of description, the sun gear is indicated by a first sun gear S1, the planet carrier is indicated by a first planet carrier PC1, and the ring gear is indicated by a first ring gear R1.

The second planetary gear set PG2 is a double pinion planetary gear set, and has three rotation elements including a sun gear, a planet carrier, and a ring gear. For better comprehension and ease of description, the sun gear is indicated by a second sun gear S2, the planet carrier is indicated by a second planet carrier PC2, and the ring gear is indicated by a second ring gear R2.

The third planetary gear set PG3 is a single pinion planetary gear set, and has three rotation elements including a sun gear, a planet carrier, and a ring gear. For better comprehension and ease of description, the sun gear is indicated by a third sun gear S3, the planet carrier is indicated by a third planet carrier PC3, and the ring gear is indicated by a third ring gear R3.

The fourth planetary gear set PG4 is a single pinion planetary gear set, and has three rotation elements including a sun gear, a planet carrier, and a ring gear. For better comprehension and ease of description, the sun gear is indicated by a fourth sun gear S4, the planet carrier is indicated by a fourth planet carrier PC4, and the ring gear is indicated by a fourth ring gear R4.

Each rotation element of the first, second, third, and fourth planetary gear sets PG1, PG2, PG3, and PG4 is connected such that one rotation element of the first planetary gear set PG1 is connected to one rotation element of the second planetary gear set PG2 through a first power transmitting member TM1, another rotation element of the second planetary gear set PG2 is connected to one rotation element of the third planetary gear set PG3 through a second power transmitting member TM2, another rotation element of the third planetary gear set PG3 is connected to one rotation element of the fourth planetary gear set PG4 through a third power transmitting member TM3, and another rotation element of the fourth planetary gear set PG4 is connected to another rotation element of the first planetary gear set PG1 through a fourth power transmitting member TM4.

Concretely, the first sun gear S1 is directly connected to the second sun gear S2 through the first power transmitting member TM1, the second planet carrier PC2 is directly connected to the third sun gear S3 through the second power transmitting member TM2, the third ring gear R3 is directly connected to the fourth planet carrier PC4 through the third power transmitting member TM3, and the first planet carrier PC1 is directly connected to the fourth ring gear R4 through the fourth power transmitting member TM4. Therefore, the gear train includes eight rotation elements N1~N8.

Accordingly, a first rotation element N1 includes the input shaft IS directly connected to the second ring gear R2, and a second rotation element N2 includes the output shaft OS connected to the third ring gear R3 and the fourth planet carrier PC4 connected to each other through the third power transmitting member TM3.

In addition, a third rotation element N3 includes the first power transmitting member TM1 connecting the first and second sun gears S1 and S2, a fourth rotation element N4 includes the first ring gear R1, and the fifth rotation element N5 includes the second power transmitting member TM2 connecting the second planet carrier PC2 with the third sun gear S3.

In addition, a sixth rotation element N6 includes the fourth power transmitting member TM4 connecting the first planet carrier PC1 with the fourth ring gear R4, a seventh rotation element N7 includes the third planet carrier PC3, and an eighth rotation element N8 includes the fourth sun gear S4.

First, second, third, and fourth clutches C1, C2, C3, and C4 and first and second brakes B1 and B2 are provided so as to selectively connect each rotation element to other rotation element or a transmission case H.

The first clutch C1 selectively connects the sixth rotation element N6 with the seventh rotation element N7, and the second clutch C2 selectively connects the fifth rotation element N5 with the eighth rotation element N8.

In addition, the third clutch C3 selectively connects the first rotation element N1 with the eighth rotation element N8, and the fourth clutch C4 selectively connects the fifth rotation element N5 with the sixth rotation element N6.

In addition, the first brake B1 is interposed between the fourth rotation element N4 and the transmission case H, and the second brake B2 is interposed between the third rotation element N3 and the transmission case H. Therefore, the third and fourth rotation elements N3 and N4 are operated as selective fixed elements.

Friction elements including the first, second, third, and fourth clutches C1, C2, C3, and C4 and the first and second brakes B1 and B2 are conventional multi-plate friction elements of wet type that are operated by hydraulic pressure.

The first and second brakes B1 and B2 are disposed at an external circumferential portion of the first planetary gear set PG1, and the first, second, third, and fourth clutches C1, C2, C3, and C4 are disposed between the second and third planetary gear sets PG2 and PG3.

If the friction elements are concentratedly disposed at a predetermined space, the friction elements cab be made compact and increase in volume of the automatic transmission may be prevented.

Figure 2:
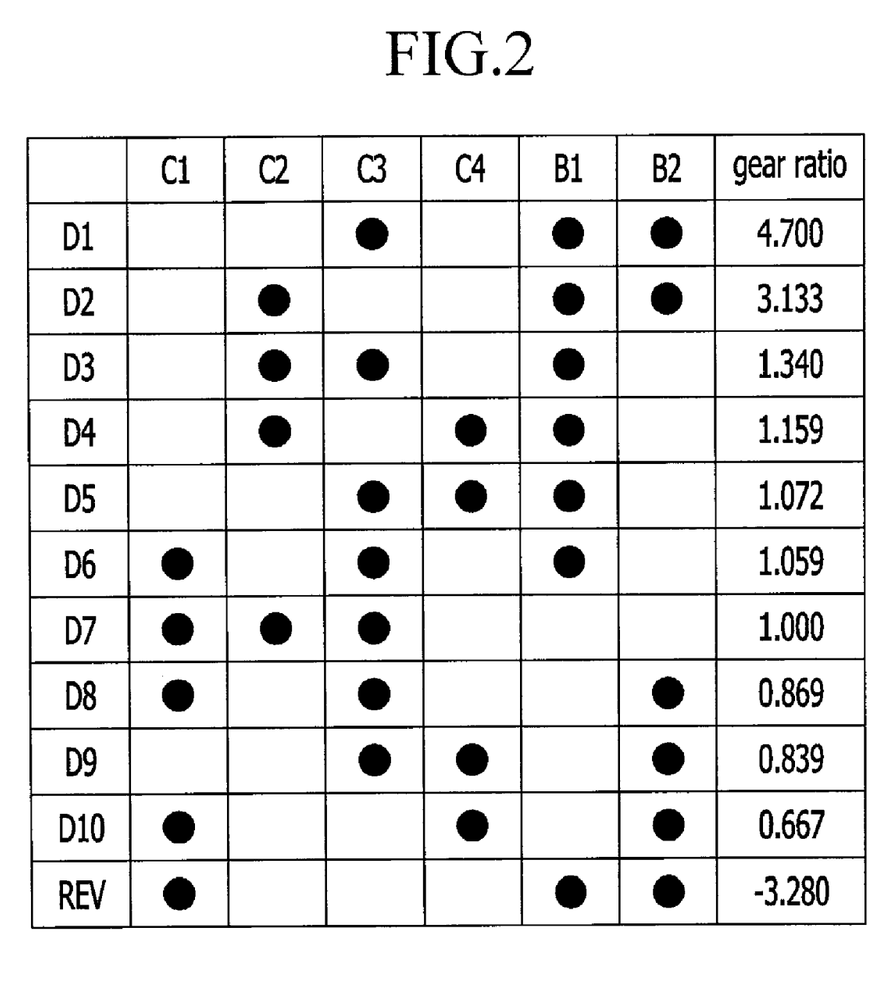
FIG. 2 is an operational chart for a gear train according to an exemplary embodiment of the present invention.

FIG. 2 is an operational chart for a gear train according to an exemplary embodiment of the present invention. That is, FIG. 2 shows which clutches and brakes are operated at each shift-speed. As shown in FIG. 2, three friction elements are operated at each shift-speed according to an exemplary embodiment of the present invention.

That is, the third clutch C3 and the first and second brakes B1 and B2 are operated at a first forward speed D1, the second clutch C2 and the first and second brakes B1 and B2 are operated at a second forward speed D2, the second and third clutches C2 and C3 and the first brake B1 are operated at a third forward speed D3, the second and fourth clutches C2 and C4 and the first brake B1 are operated at a fourth forward speed D4, the third and fourth clutches C3 and C4 and the first brake B1 are operated at a fifth forward speed D5, the first and third clutches C1 and C3 and the first brake B1 are operated at a sixth forward speed D6, the first, second, and third clutches C1, C2, and C3 are operated at a seventh forward speed D7, the first and third clutches C1 and C3 and the second brake B2 are operated at an eighth forward speed D8, the third and fourth clutches C3 and C4 and the second brake B2 are operated at a ninth forward speed D9, the first and fourth clutches C1 and C4 and the second brake B2 are operated at a tenth forward speed D10, and the first clutch C1 and the first and second brakes B1 and B2 are operated at a reverse speed REV.

FIG. 3 to FIG. 13 are lever diagrams for a gear train according to an exemplary embodiment of the present invention. In the drawings, a lower horizontal line represents a rotational speed is "0", and an upper horizontal line represents a rotational speed is "1.0", that is, the rotational speed thereof is the same as that of the input shaft IS.

Three vertical lines of the first planetary gear set PG1 sequentially represent the first sun gear S1, the first planet carrier PC1, and the first ring gear R1 from the left to the right, and distances therebetween are set according to a gear ratio (teeth number of the sun gear/teeth number of the ring gear) of the first planetary gear set PG1.

Three vertical lines of the second planetary gear set PG2 sequentially represent the second sun gear S2, the second ring gear R2, and the second planet carrier PC2 from the left to the right, and distances therebetween are set according to a gear ratio (teeth number of the sun gear/teeth number of the ring gear) of the second planetary gear set PG2.

Three vertical lines of the third planetary gear set PG3 sequentially represent the third sun gear S3, the third planet carrier PC3, and the third ring gear R3 from the left to the right, and distances therebetween are set according to a gear ratio (teeth number of the sun gear/teeth number of the ring gear) of the third planetary gear set PG3.

Three vertical lines of the fourth planetary gear set PG4 sequentially represent the fourth sun gear S4, the fourth planet carrier PC4, and the fourth ring gear R4 from the left to the right, and distances therebetween are set according to a gear ratio (teeth number of the sun gear/teeth number of the ring gear) of the fourth planetary gear set PG4.

Position of each rotation element in the lever diagram is well known to a person of an ordinary skill in the art who designs a gear train, and thus detailed description will be omitted.

[First Forward Speed]

At the first forward speed D1, the third clutch C3 and the first and second brakes B1 and B2 are operated, as shown in FIG. 2.

Figure 3:
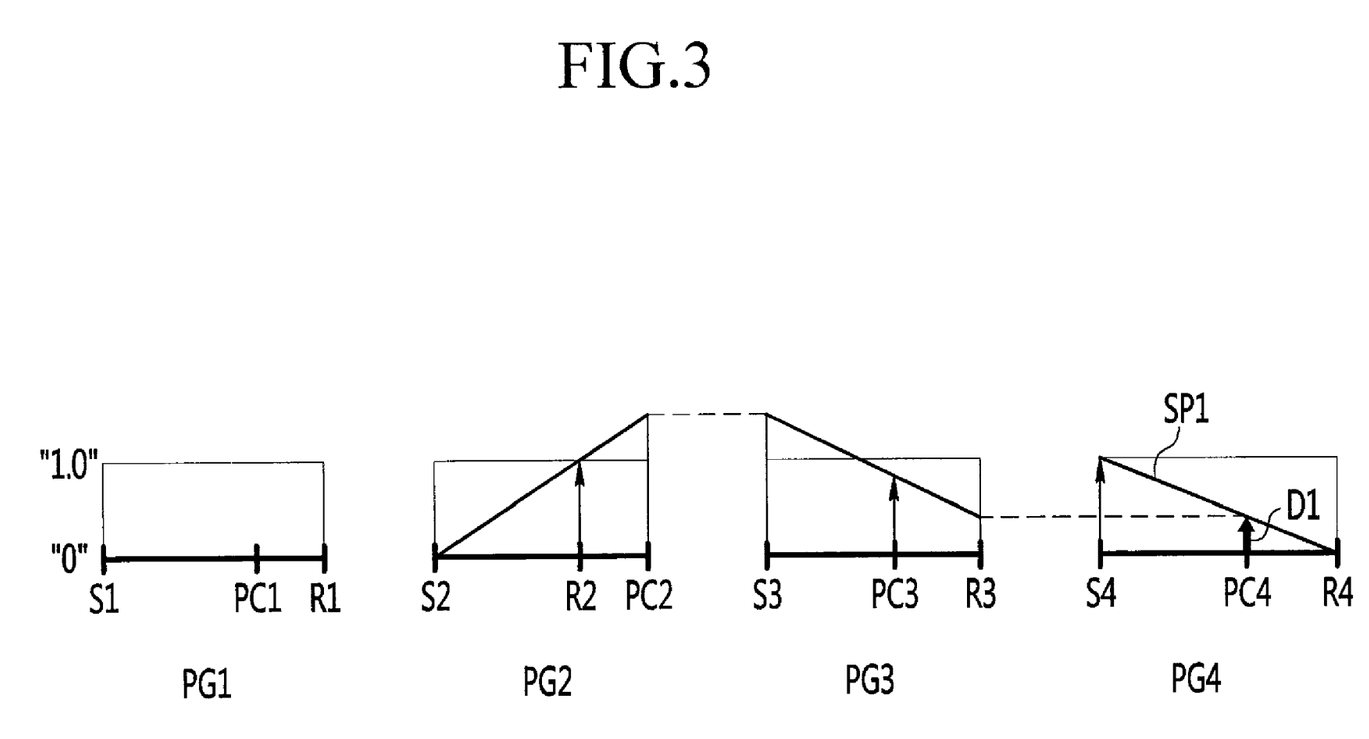
FIG. 3 is a lever diagram for a gear train according to an exemplary embodiment of the present invention at the first forward speed.

As shown in FIG. 3, all rotation elements of the first planetary gear set PG1 are stopped by operations of the first and second brakes B1 and B2, and accordingly, the fourth ring gear R4 of the fourth planetary gear set PG4 is operated as a fixed element.

In a state that a rotation speed of the input shaft is input to the second ring gear R2, the rotation speed of the input shaft IS is input to the fourth sun gear S4 of the fourth planetary gear set PG4 by an operation of the third clutch C3.

At this time, since the rotation speed of the input shaft IS input to the fourth sun gear S4 and the fourth ring gear R4 is stopped, the rotation elements of the fourth planetary gear set PG4 form a first shift line SP1, and the first forward speed D1 is output through the fourth planet carrier PC4 that is an output element.

In this case, the second planetary gear set PG2 and the third planetary gear set PG3 have no effects on shifting.

[Second Forward Speed]

At the second forward speed D2, the third clutch C3 that was operated at the first forward speed D1 is released and the second clutch C2 is operated, as shown in FIG. 2.

Figure 4:
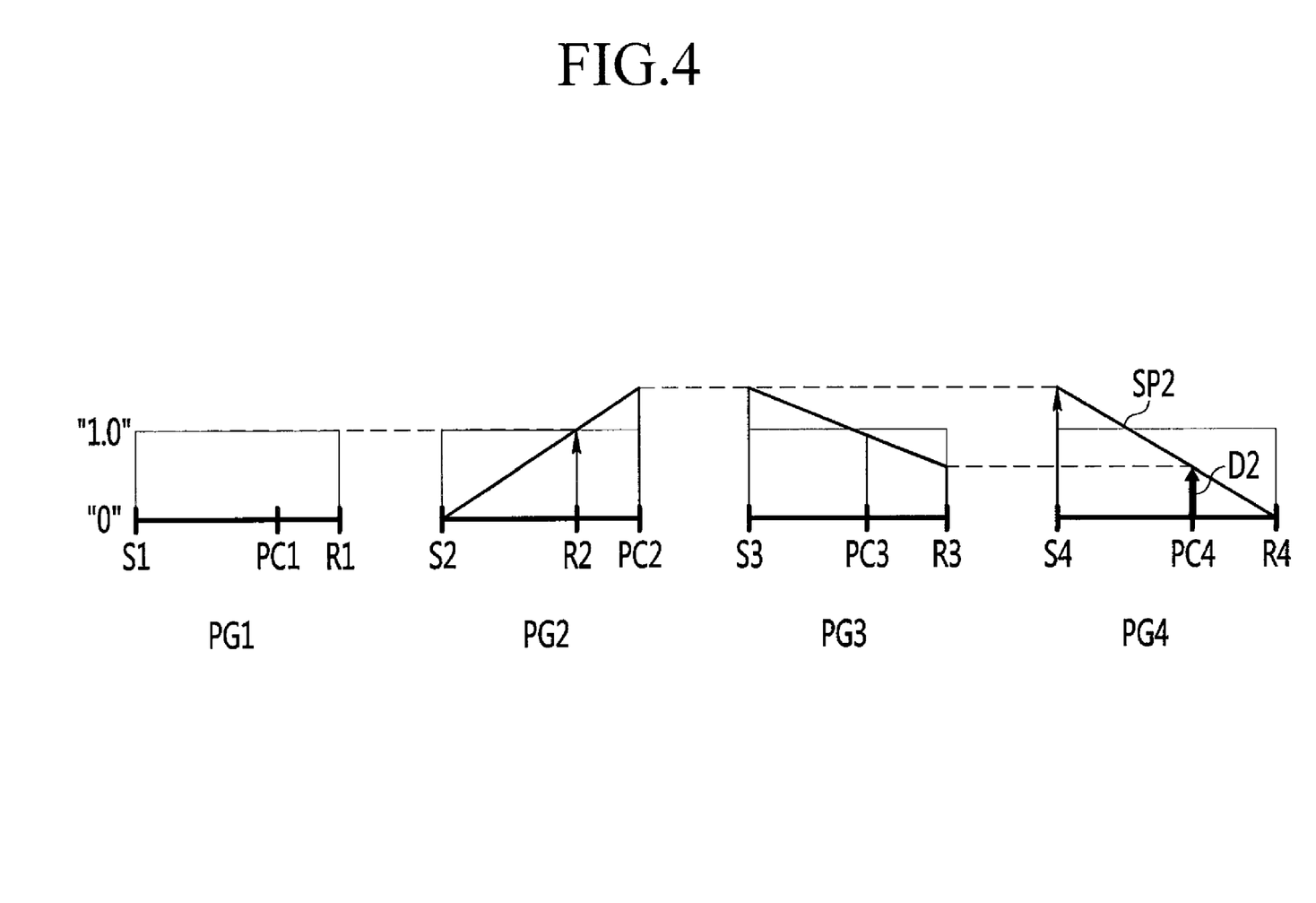
FIG. 4 is a lever diagram for a gear train according to an exemplary embodiment of the present invention at the second forward speed.

As shown in FIG. 4, a rotation speed increased at the second planetary gear set PG2 is input to the fourth sun gear S4 of the fourth planetary gear set PG4 by an operation of the second clutch C2 in a state of the first forward speed D1. Therefore, the rotation elements of the fourth planetary gear set PG4 form a second shift line SP2, and the second forward speed D2 is output through the fourth planet carrier PC4 that is the output element.

In this case, the third planetary gear set PG3 has no effects on the shifting.

[Third Forward Speed]

At the third forward speed D3, the second brake B2 that was operated at the second forward speed D2 is released and the third clutch C3 is operated, as shown in FIG. 2.

Figure 5:
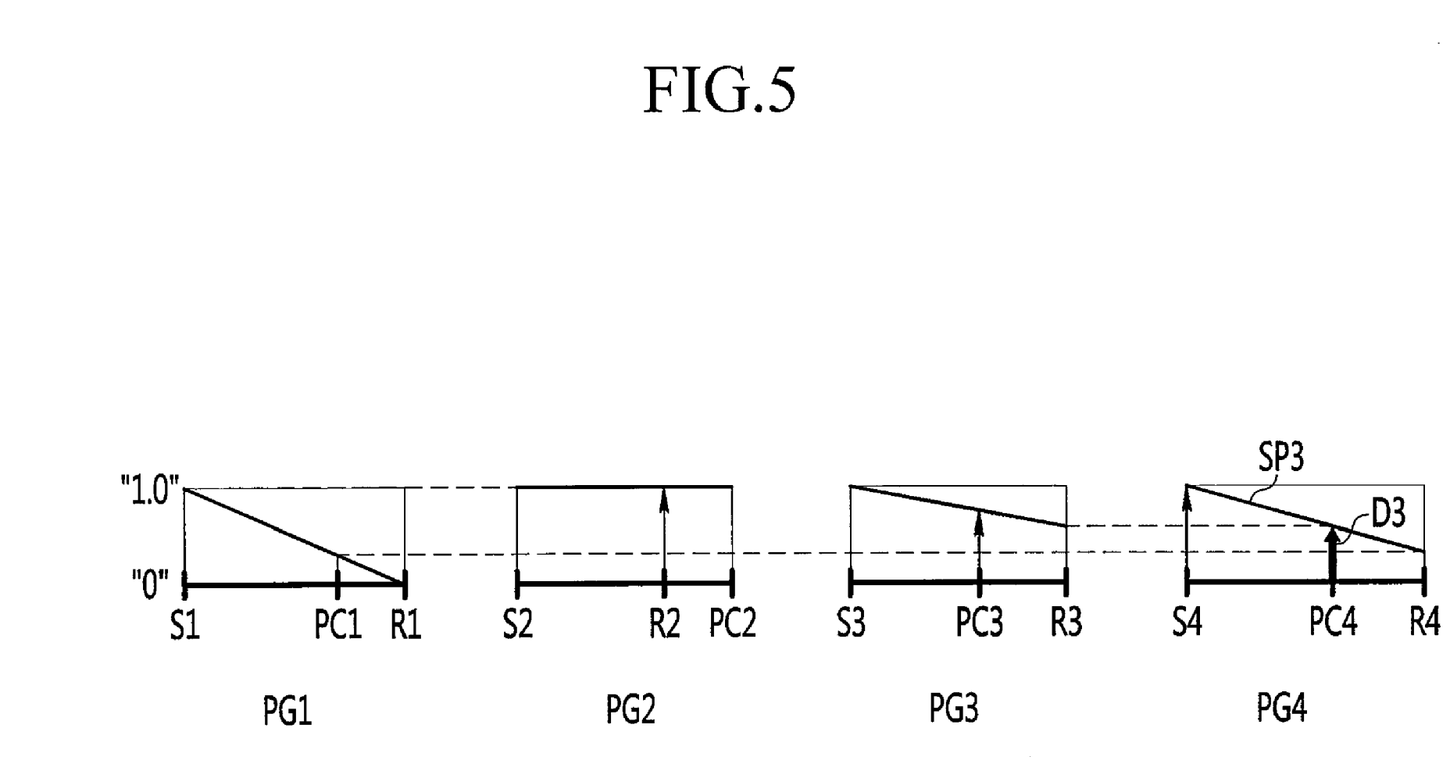
FIG. 5 is a lever diagram for a gear train according to an exemplary embodiment of the present invention at the third forward speed.

As shown in FIG. 5, the first ring gear R1 is operated as the fixed element in the first planetary gear set PG1 by the operation of the first brake B1.

In addition, the second and third planetary gear sets PG2 and PG3 become direct-coupling state by the operations of the second and third clutches C2 and C3 and transmits the rotation speed of the input shaft IS to the first sun gear S1.

Accordingly, the first planetary gear set PG1 outputs a reduced rotation speed through the first planet carrier PC1 and the reduced rotation speed is transmitted to the fourth ring gear R4 of the fourth planetary gear set PG4.

In a state that the rotation speed of the input shaft IS is input to the fourth sun gear S4, the reduced rotation speed is input to the fourth ring gear R4 in the fourth planetary gear set PG4. Therefore, the rotation elements of the fourth planetary gear set PG4 form a third shift line SP3, and the third forward speed D3 is output through the fourth planet carrier PC4 that is the output element.

[Fourth Forward Speed]

At the fourth forward speed D4, the third clutch C3 that was operated at the third forward speed D3 is released and the fourth clutch C4 is operated, as shown in FIG. 2.

Figure 6:
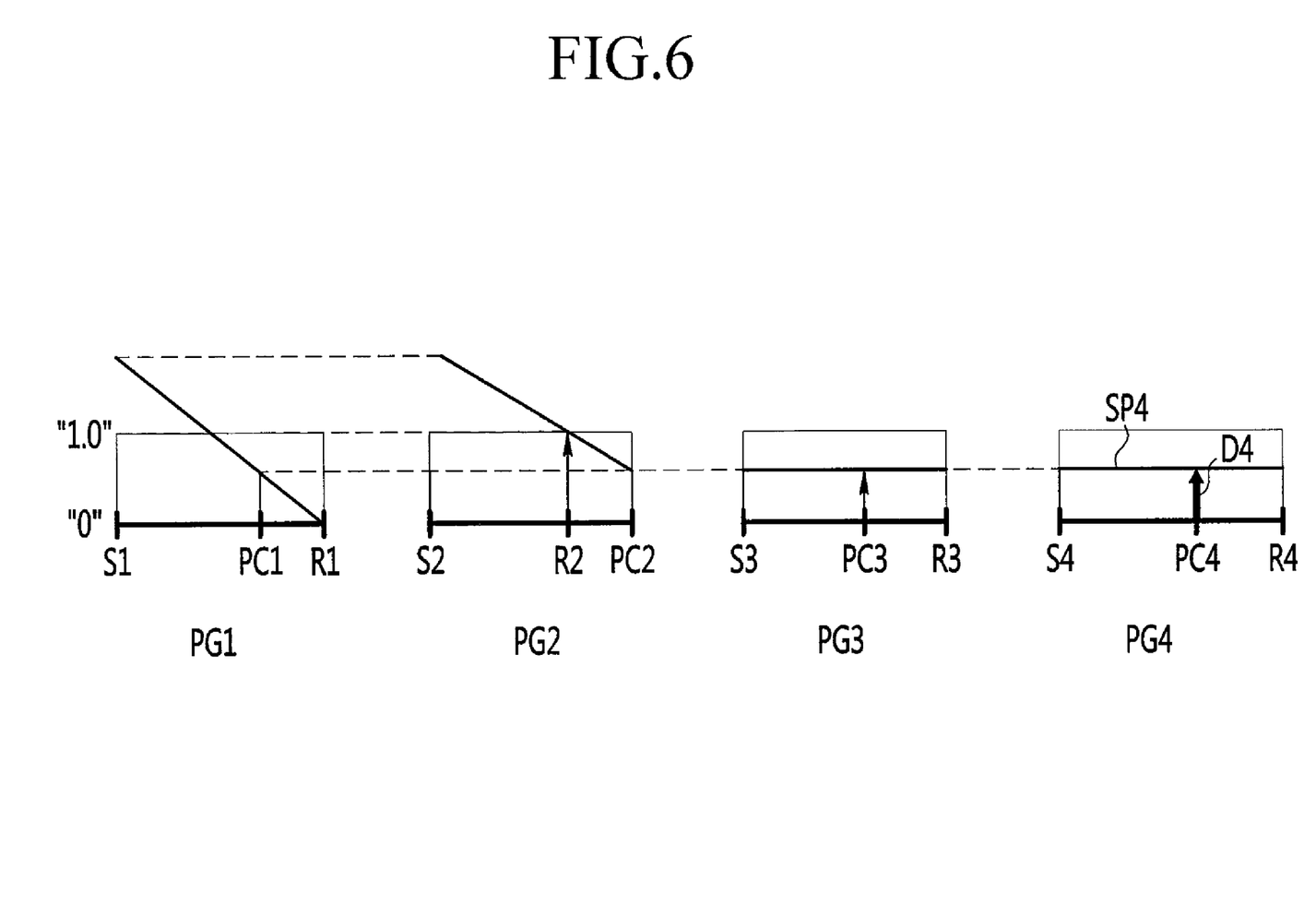
FIG. 6 is a lever diagram for a gear train according to an exemplary embodiment of the present invention at the fourth forward speed.

As shown in FIG. 6, the third and fourth planetary gear sets PG3 and PG4 become direct-coupling state by the operation of the second and fourth clutches C2 and C4, the rotation speed of the input shaft IS input to the second ring gear R2, and the first ring gear R1 is operated as the fixed element.

Therefore, the rotation elements of the fourth planetary gear set PG4 form a fourth shift line SP4 by the interaction of the first and second planetary gear sets PG1 and PG2, and the fourth forward speed D4 is output through the fourth planet carrier PC4 that is the output element.

[Fifth Forward Speed]

At the fifth forward speed D5, the second clutch C2 that was operated at the fourth forward speed D4 is released and the third clutch C3 is operated, as shown in FIG. 2.

Figure 7:
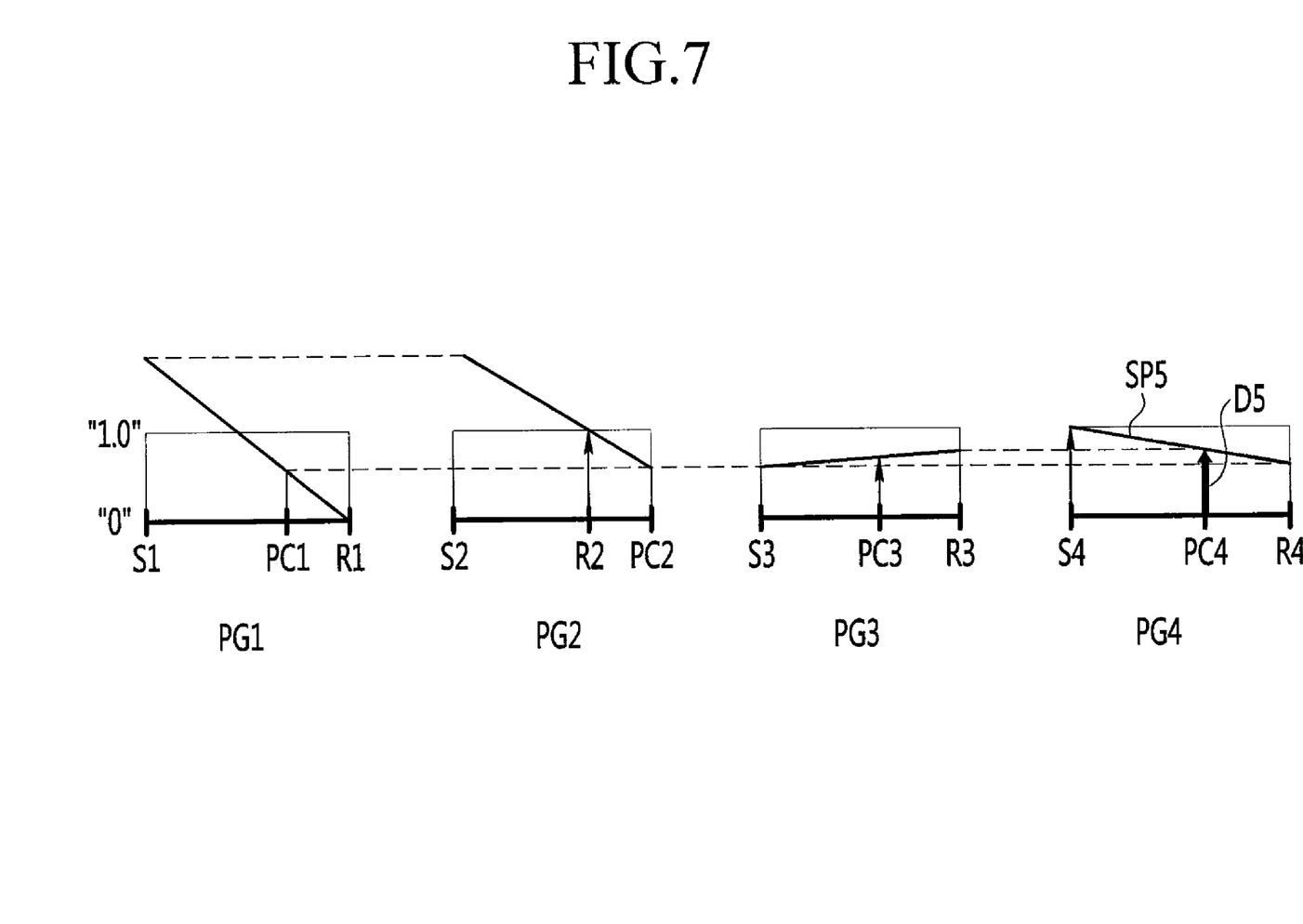
FIG. 7 is a lever diagram for a gear train according to an exemplary embodiment of the present invention at the fifth forward speed.

As shown in FIG. 7, in a state that the third and fourth planetary gear sets PG3 and PG4 are released from the direct-coupling state by the release of the second clutch C2, the rotation speed of the input shaft IS is input to the second ring gear R2 and the fourth sun gear S4 by the operation of the third clutch C3 and the first ring gear R1 is operated as the fixed element.

Then, the rotation speed of the first planet carrier PC1 is input to the third sun gear S3 and the fourth ring gear R4 by the interaction of the first and second planetary gear sets PG1 and PG2. Therefore, the rotation elements of the fourth planetary gear set PG4 form a fifth shift line SP5, and the fifth forward speed D5 is output through the fourth planet carrier PC4 that is the output element.

[Sixth Forward Speed]

At the sixth forward speed D6, the fourth clutch C4 that was operated at the fifth forward speed D5 is released and the first clutch C1 is operated, as shown in FIG. 2.

Figure 8:
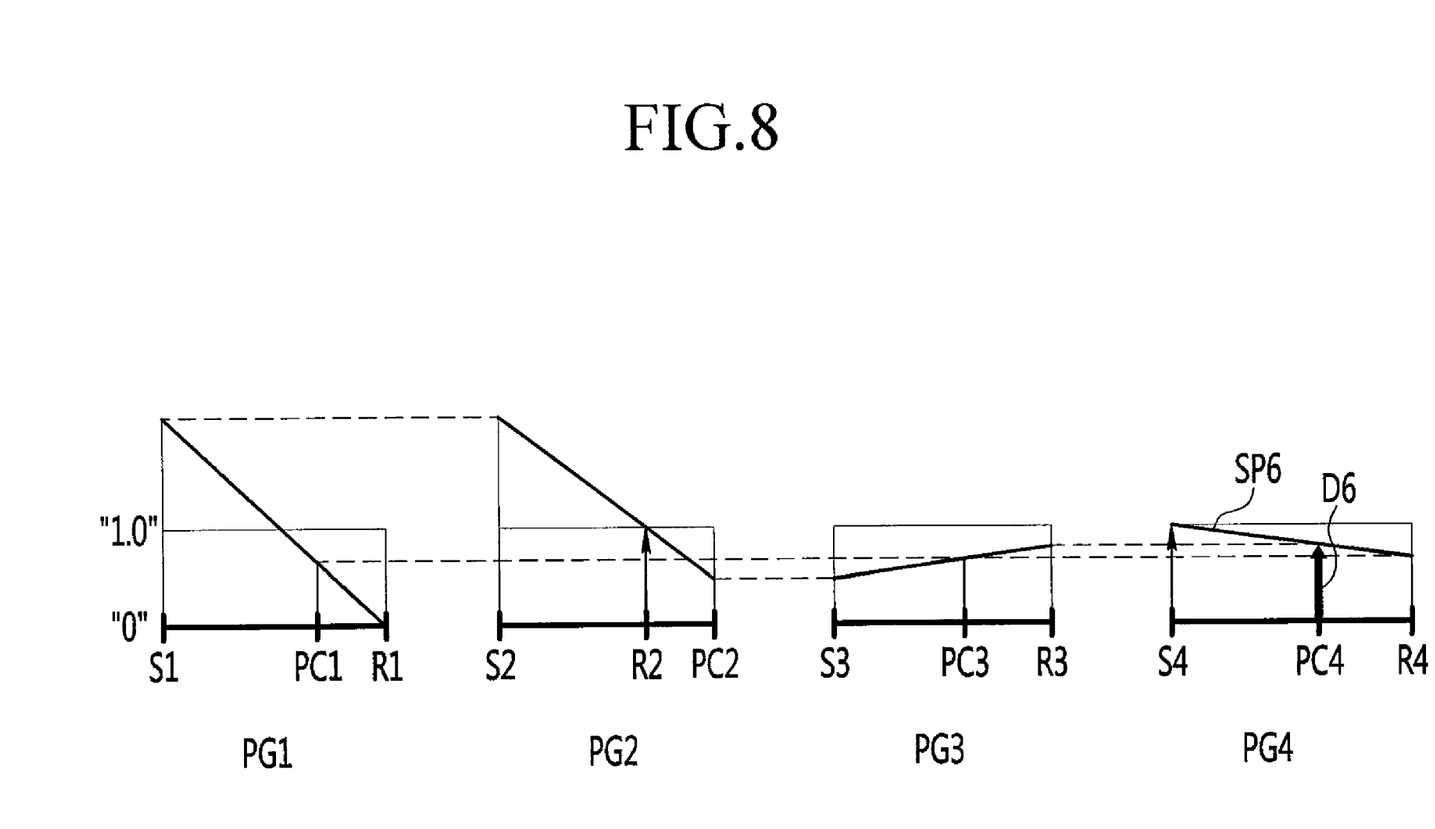
FIG. 8 is a lever diagram for a gear train according to an exemplary embodiment of the present invention at the sixth forward speed.

As shown in FIG. 8, the rotation speed of the first planet carrier PC1 is input to the third planet carrier PC3 and the fourth ring gear R4 by the operation of the first clutch C1 in a state of the fifth forward speed D5. Therefore, the rotation elements of the fourth planetary gear set PG4 form a sixth shift line SP6, and the sixth forward speed D6 is output through the fourth planet carrier PC4 that is the output element.

[Seventh Forward Speed]

At the seventh forward speed D7, the first brake B1 that was operated at the sixth forward speed D6 is released and the second clutch C2 is operated, as shown in FIG. 2.

Figure 9:
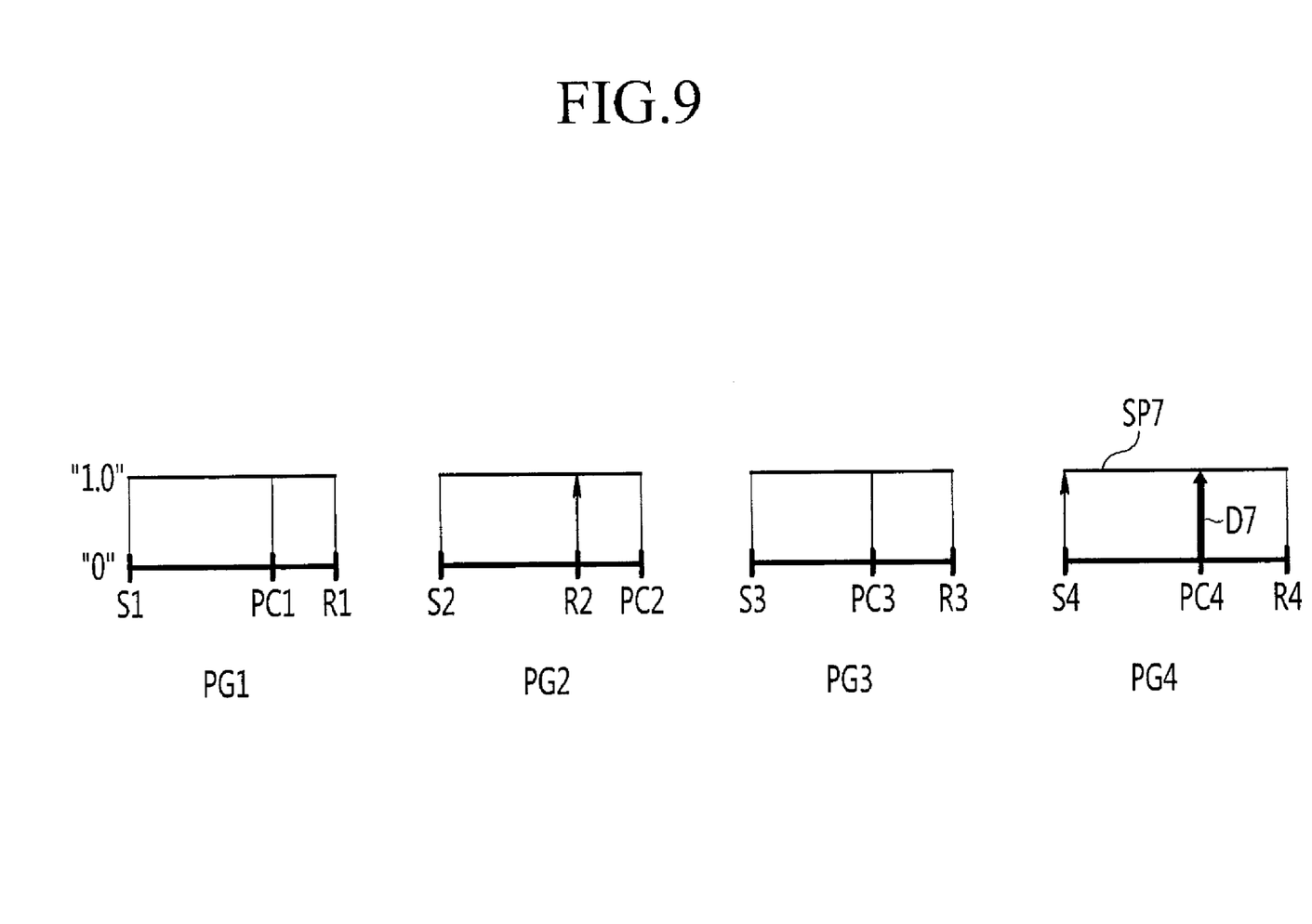
FIG. 9 is a lever diagram for a gear train according to an exemplary embodiment of the present invention at the seventh forward speed.

As shown in FIG. 9, the first, second, third, and fourth planetary gear sets PG1, PG2, PG3, and PG4 become the direct-coupling state by the operations of the first, third, and fourth clutches C1, C3, and C4, and the rotation speed of the input shaft IS is input to the second ring gear R2 and the fourth sun gear S4 in a state that there is no fixed element by the release of the first brake B1.

Therefore, the rotation elements of the fourth planetary gear set PG4 form a seventh shift line SP7, and the seventh forward speed D7 is output through the fourth planet carrier PC4. The rotation speed of the seventh forward speed D7 is the same as that of the input shaft IS.

[Eighth Forward Speed]

At the eighth forward speed D8, the second clutch C2 that was operated at the seventh forward speed D7 is released and the second brake B2 is operated, as shown in FIG. 2.

Figure 10:
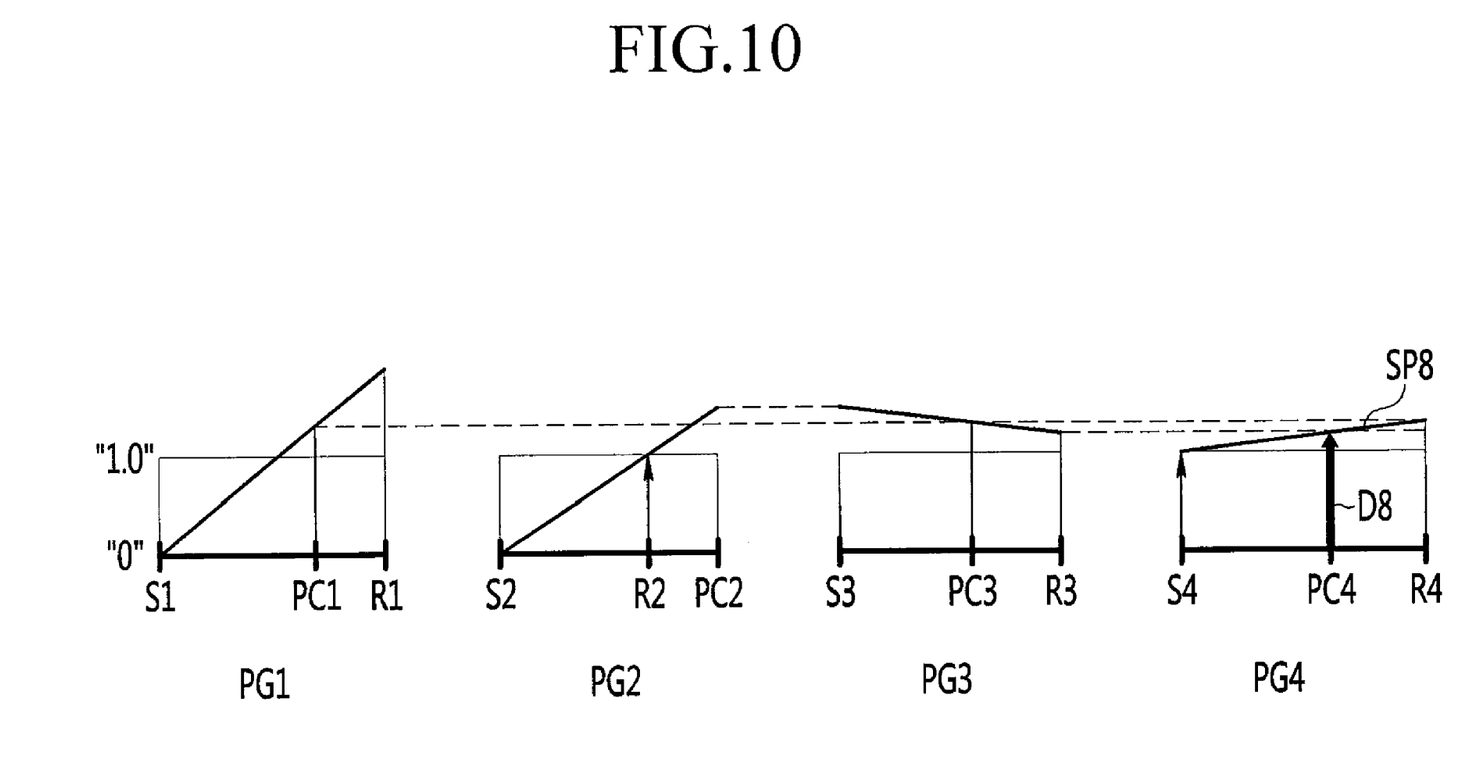
FIG. 10 is a lever diagram for a gear train according to an exemplary embodiment of the present invention at the eighth forward speed.

As shown in FIG. 10, in a stated that the first, second, third, and fourth planetary gear sets PG1, PG2, PG3, and PG4 are released from the direct-coupling state by the release of the second clutch C2, the rotation speed of the input shaft IS is input to the second ring gear R2 and the fourth sun gear S4 by the operation of the third clutch C3 and the first sun gear S1 is operated as the fixed element by the operation of the second brake B2.

In addition, since the second sun gear S2 fixedly connected to the first sun gear S1 is operated as the fixed element and the rotation speed of the input shaft IS is input to the second ring gear R2, the second planet carrier PC2 rotates with an increased rotation speed and the rotation speed of the second planet carrier PC2 is input to the third sun gear S3.

In the third and fourth planetary gear sets PG3 and PG4, the rotation speed of the second planet carrier PC2 is input to the third sun gear S3, the rotation speed of the input shaft IS is input to the fourth sun gear S4, the fourth planet carrier PC4 is fixedly connected to the third ring gear R3, and the third planet carrier PC3 is connected to the fourth ring gear R4 by the operation of the first clutch C1.

Therefore, the rotation elements of the fourth planetary gear set PG4 form an eighth shift line SP8, and the eighth forward speed D8 is output through the fourth planet carrier PC4 that is the output element.

[Ninth Forward Speed]

At the ninth forward speed D9, the first clutch C1 that was operated at the eighth forward speed D8 is released and the fourth clutch C4 is operated, as shown in FIG. 2.

Figure 11:
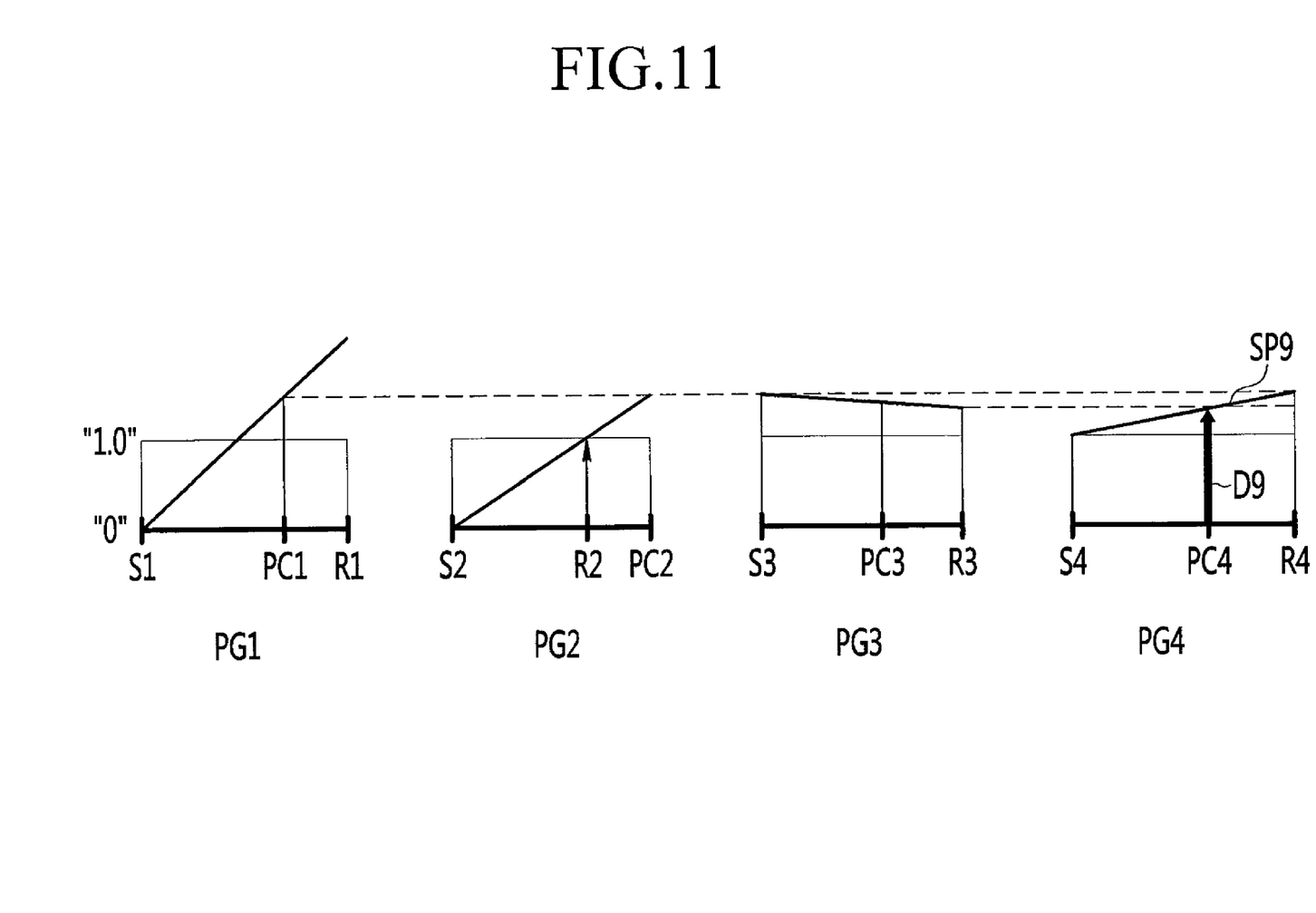
FIG. 11 is a lever diagram for a gear train according to an exemplary embodiment of the present invention at the ninth forward speed.

As shown in FIG. 11, since the second sun gear S2 is stopped by the operation of the second brake B2 and the rotation speed of the input shaft IS is input to the second ring gear R2, the second planet carrier PC2 rotates with an increased rotation speed and the rotation speed of the second planet carrier PC2 is input to the third sun gear S3.

In the third and fourth planetary gear sets PG3 and PG4, the rotation speed of the second planet carrier PC2 is input to the fourth ring gear R4 by the operation of the fourth clutch C4, the rotation speed of the input shaft IS is input to the fourth sun gear S4 by the operation of the third clutch C3, and the fourth planet carrier PC4 is fixedly connected to the third ring gear R3.

Therefore, the rotation elements of the fourth planetary gear set PG4 form a ninth shift line SP9, and the ninth forward speed D9 is output through the fourth planet carrier PC4 that is the output element.

[Tenth Forward Speed]

At the tenth forward speed D10, the third clutch C3 that was operated at the ninth forward speed D9 is released and the first clutch C1 is operated, as shown in FIG. 2.

Figure 12:
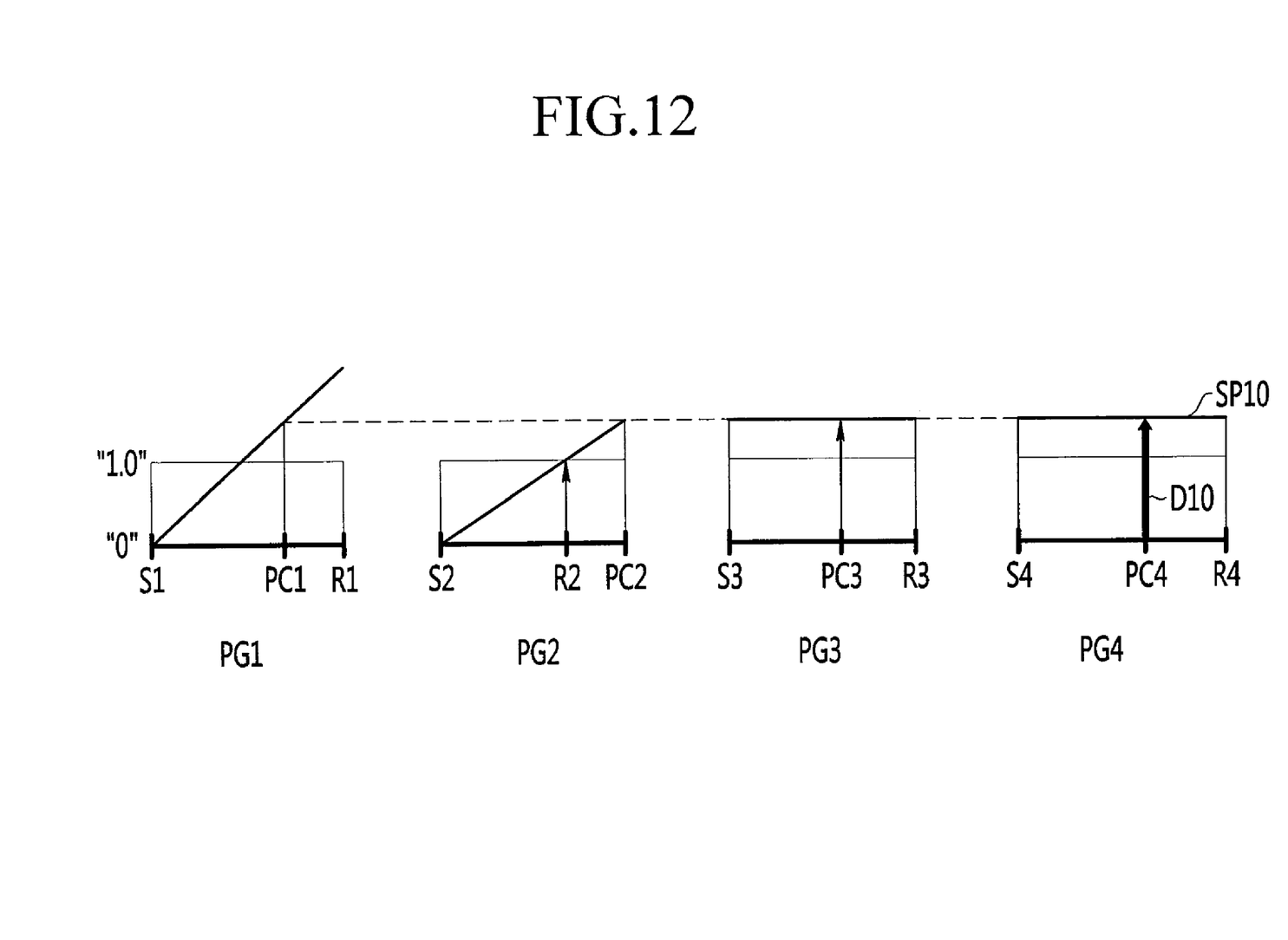
FIG. 12 is a lever diagram for a gear train according to an exemplary embodiment of the present invention at the tenth forward speed.

As shown in FIG. 12, since the second sun gear S2 is stopped by the operation of the second brake B2 and the rotation speed of the input shaft IS is input to the second ring gear R2, the second planet carrier PC2 rotates with an increased rotation speed and the rotation speed of the second planet carrier PC2 is input to the third sun gear S3.

In the third and fourth planetary gear sets PG3 and PG4, the rotation speed of the second planet carrier PC2 is input to the fourth ring gear R4 by the operation of the fourth clutch C4, and the third planet carrier PC3 is connected to the fourth ring gear R4 by the operation of the first clutch C1.

Therefore, the rotation elements of the fourth planetary gear set PG4 form a tenth shift line SP10, and the tenth forward speed D10 is output through the fourth planet carrier PC4 that is the output element.

[Reverse Speed]

At the reverse speed REV, the first clutch C1 and the first and second brakes B1 and B2 are operated, as shown in FIG. 2.

Figure 13:
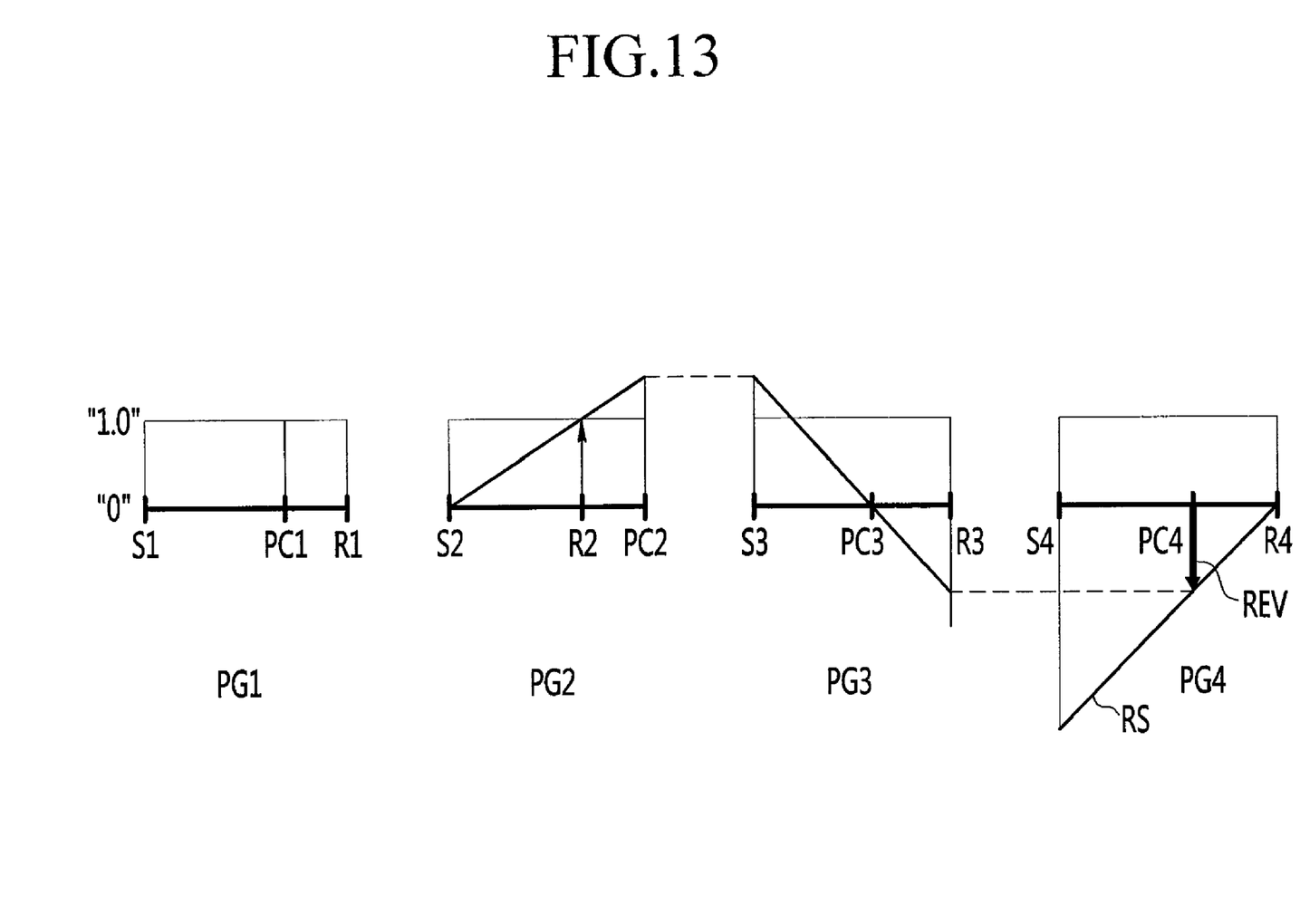
FIG. 13 is a lever diagram for a gear train according to an exemplary embodiment of the present invention at the reverse speed.

As shown in FIG. 13, all rotation elements of the first planetary gear set PG1 are stopped by the operations of the first and second brakes B1 and B2, and accordingly, the second sun gear S2, the third planet carrier PC3, and the fourth ring gear R4 are operated as the fixed element.

If the rotation speed of the input shaft IS is input to the second ring gear R2 at this state, the increased rotation speed of the second planet carrier PC2 is input to the third sun gear S3, and the third ring gear R3 fixedly connected to the fourth planet carrier PC4 rotates inversely. Therefore, the rotation elements of the fourth planetary gear set PG4 form a reverse shift line RS, and the reverse speed REV is output through the fourth planet carrier PC4 that is the output element.

According to an exemplary embodiment of the present invention, ten forward speeds and one reverse speed can be achieved by using four simple planetary gear sets, four clutches, and two brakes.

As described above, ten forward speeds and one reverse speed are achieved by combining four simple planetary gear sets with four clutches and two brakes. Three friction elements are operated at each shift-speed. Therefore, power delivery performance and fuel economy may be improved.

Since the friction elements are concentratedly disposed at two predetermined space, the friction elements cab be made compact and volume of the automatic transmission cannot be increased.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A gear train of an automatic transmission for vehicles including a first planetary gear set having a first sun gear, a first planet carrier, and a first ring gear as rotation elements thereof, a second planetary gear set having a second sun gear, a second planet carrier, and a second ring gear as rotation elements thereof, a third planetary gear set having a third sun gear, a third planet carrier, and a third ring gear as rotation elements thereof, a fourth planetary gear set having a fourth sun gear, a fourth planet carrier, and a fourth ring gear as rotation elements thereof, and a plurality of friction members,
    wherein a rotation element of the first planetary gear set is connected to a rotation element of the second planetary gear set through a first power transmitting member, another rotation element of the second planetary gear set is connected to a rotation element of the third planetary gear set through a second power transmitting member, another rotation element of the third planetary gear set is connected to a rotation element of the fourth planetary gear set through a third power transmitting member, and another rotation element of the fourth planetary gear set is connected to another rotation element of the first planetary gear set through a fourth power transmitting member such that eight rotation elements are formed,
    wherein the eight rotation elements comprises a first rotation element including an input shaft directly connected to the second ring gear, a second rotation element including an output shaft connected to the fourth planet carrier connected to the third ring gear through the third power transmitting member, a third rotation element including the first power transmitting member directly connecting the first and second sun gears, a fourth rotation element including the first ring gear, a fifth rotation element including the second power transmitting member directly connecting the second planet carrier with the third sun gear, a sixth rotation element including the fourth power transmitting member directly connecting the first planet carrier with the fourth ring gear, a seventh rotation element including the third planet carrier, and an eighth rotation element including the fourth sun gear, and wherein the plurality of friction members comprises first, second, third, and fourth clutches selectively connecting the rotation elements with other rotation elements and first and second brakes selectively connecting the rotation elements with a transmission housing.

2. The gear train of claim 1, wherein the first, second, third, and fourth planetary gear sets are disposed in a sequence of the first planetary gear set, the second planetary gear set, the third planetary gear set, and the fourth planetary gear set from an engine.

3. The gear train of claim 1, wherein the first, third, and fourth planetary gear sets are single pinion planetary gear sets and the second planetary gear set is a double pinion planetary gear set.

4. The gear train of claim 1, wherein the friction members comprise:
   the first clutch selectively connecting the sixth rotation element with the seventh rotation element;
   the second clutch selectively connecting the fifth rotation element with the eighth rotation element;
   the third clutch selectively connecting the first rotation element with the eighth rotation element;
   the fourth clutch selectively connecting the fifth rotation element with the sixth rotation element;
   the first brake selectively connecting the fourth rotation element with the transmission case; and
   the second brake selectively connecting the third rotation element with the transmission case.

5. The gear train of claim 4, wherein the first and second brakes are disposed at an external circumferential portion of the first planetary gear set, and the first, second, third, and fourth clutches are disposed between the second and third planetary gear sets.

6. The gear train of claim 4, wherein the third clutch and the first and second brakes are operated at a first forward speed,
   the second clutch and the first and second brakes are operated at a second forward speed,
   the second and third clutches and the first brake are operated at a third forward speed,
   the second and fourth clutches and the first brake are operated at a fourth forward speed,
   the third and fourth clutches and the first brake are operated at a fifth forward speed,
   the first and third clutches and the first brake are operated at a sixth forward speed,
   the first, second, and third clutches are operated at a seventh forward speed,
   the first and third clutches and the second brake are operated at an eighth forward speed,
   the third and fourth clutches and the second brake are operated at a ninth forward speed,
   the first and fourth clutches and the second brake are operated at a tenth forward speed, and
   the first clutch and the first and second brakes are operated at a reverse speed.

* * * * *